United States Patent Office 2,726,931

Patented Dec. 13, 1955

1

2,726,931

PRODUCTION OF HYDROGEN CYANIDE

Alvin B. Stiles, Charleston, W. Va., assignor to E. I. du Pont de Nemours and Company, Wilmington, Del., a corporation of Delaware No Drawing. Application November 1, 1951, Serial No. 254,458

8 Claims. (Cl. 23—151)

This invention relates to the production of hydrogen cyanide and, more particularly, by the catalytic reaction between ammonia, natural gas, and air.

Processes are known in the prior art which produce hydrogen cyanide by passing a mixture of nitrogen-containing gases and hydrocarbon gases over a platinum or platinum alloy catalyst. The platinum alloy which has been used as a catalyst may contain minor amounts of one or more of other rare metals, such as iridium, rhodium, and palladium. Some known processes have employed a platinum-containing catalyst in the form of a fine wire gauze or a series of such gauzes. The use of such gauzes, however, proved to be expensive because the gauzes disintegrated after a period of use, and thus necessitated replacement of the gauzes. Many attempts were made in later processes to overcome this loss of rare metal, for example, by enclosing the gauzes in a bed of porous supporting materials which would retain any platinum or platinum alloy lost from the gauze. The supporting materials which have been used include alumina, siliceous materials, sillimanite, etc. More recently, attempts have been made to coat the platinum or platinum alloy on particles of the same type of supporting materials in such a way as to prevent loss of the rare metal during its use as a catalyst. Because of the sensitivity of the hydrogen cyanide process to impurities in the catalyst and its support, the success of the coated-particle type of catalyst varied.

Naturally occurring beryl (beryllium aluminum silicate) has been found in the past to be one of the most satisfactory of the supporting materials which may be coated with platinum or platinum alloy to form a catalyst for hydrogen cyanide manufacture. U. S. Patent 2,387,577 describes a process for passing nitric oxide and a hydrocarbon over a catalyst of beryl granules coated with a platinum-rhodium alloy. U. S. Patent 2,478,875 describes a process for passing purified natural gas, ammonia, and oxygen over a catalyst of beryl granules coated with platinum-containing metal. However, beryl, like all other naturally occurring minerals, is not easily reproducible. Every batch or lot requires careful sorting and treating so as to be as near the same as possible to a previous satisfactory lot, and thereby to produce the same hydrogen cyanide yield.

It is an object of this invention to overcome the disadvantages of the prior art and to provide an improved, synthetic, easily reproducible, supported catalyst capable of giving yields equal to or better than those obtained by the use of beryl, for the conversion of natural gas, ammonia, and air to hydrogen cyanide. Other objects and advantages of this invention will be apparent from the following examples and more detailed description of the invention.

The above objects are attained by the use of an alumina-zirconia porcelain catalyst support formed into a granular, non-porous, refractory material capable of withstanding the reaction temperatures, which will be approximately 1000° C. to 1200° C.

2

In the preferred practice of this invention ammonia, natural gas, and air are mixed and passed over a platinum-rhodium alloy coated on the surface of alumina-zirconia porcelain particles as a catalyst. The reactant gases are prepared by mixing 1 volume of ammonia for every 1.90 volumes of natural gas and 10 volumes of air. The catalyst bed is generally maintained at a temperature of 1000° C. to 1200° C. The gases enter the catalyst chamber at room temperature and about two pounds per square inch gauge pressure, and preferably pass through the reactor at a space velocity of 30,000 to 210,000 volumes per hour of reactant gases at standard temperature and pressure for each volume of catalyst.

The catalyst in this invention is prepared by crushing a porcelain containing 90% to 98% $Al_2O_3$, 1% to 5% $ZrO_2$, 0.5% to 2.0% CaO, and 0.0% to 1.5% MgO. The porcelain should have a porosity of less than 2% and a firing temperature of 3100° F. to 3225° F. This material is crushed until it will pass a 6-mesh screen and remain on a 10-mesh Tyler Standard Screen. The screen fraction is etched by slurrying the granules for 30 minutes in a 20% to 50% aqueous solution of sodium hydroxide at 100° C. to 110° C., the purpose of such etching being to roughen the surface of the granules and so provide a more adherent surface for later coating with metal alloy. The caustic-etched particles are washed with water until the pH of the wash water is below 8.2 as indicated by phenolphthalein. This wash is followed by slurrying the particles in 70% nitric acid for 30 minutes at 100° C. The acid-treated particles are then washed with water until the pH of the water is in the range of 5.2–6.4 as indicated by methyl green. After the granules are dried they are coated with a layer of platinum alloy, for example, platinum and rhodium, by placing the granules in a solution of platinum and rhodium chlorides and evaporating the water, thus causing the chlorides to deposit on the surface of the granules. The coated granules are then heated to a temperature of 1250° C. to 1300° C., by means of a stream of air, at which temperature the chlorides are decomposed leaving the pure metal alloy deposited on the granules. This coating and heating process is repeated until there are five layers deposited on the granules, completely covering them with metal.

The following examples are presented to show various procedures for making HCN, and to further explain the advantages of this invention over the prior art.

*Example I*

Beryl was coated with a platinum-rhodium alloy (approximately 80% platinum and 20% rhodium). The reactant gases were prepared by mixing 1 volume of ammonia with 1.90 volumes of natural gas and 10 volumes of air. This mixture was passed over the catalyst, which was maintained at a temperature of 1000° C. to 1200° C., giving a conversion of 66% of the ammonia to hydrogen cyanide.

*Example II*

A catalyst was prepared of platinum and rhodium (80% Pt and 20% Rh) coated on a porcelain catalyst of the following composition: 91.5% $Al_2O_3$, 7.5% $ZrO_2$, 0.5% CaO, and 0.5% MgO. The catalyst was prepared substantially as disclosed above by crushing, screening, etching, washing, and coating until five layers of metal were placed on the granules. A gas mixture of 1 volume of ammonia, 1.90 volumes of natural gas, and 10 volumes of air was passed over the catalyst bed which was maintained at a temperature of 1000° C. to 1200° C. A conversion of 50% of ammonia to hydrogen cyanide was obtained.

*Example III*

The reaction of Example II was carried out using a porcelain of the following composition: 95.5% $Al_2O_3$, 3.5% $ZrO_2$, 0.5% CaO, and 0.5% MgO. The conversion of ammonia to hydrogen cyanide was 65%.

*Example IV*

The reaction of Example II was carried out using a porcelain of the following composition: 97.0% $Al_2O_3$, 2.0% of $ZrO_2$, 0.5% CaO, and 0.5% MgO. The conversion of ammonia to hydrogen cyanide was 66%.

*Example V*

The reaction of Example II was carried out using several samples of zirconia-free porcelain with the following average composition: 97.0% $Al_2O_3$, 1.5% CaO, and 1.5% MgO. The conversion of ammonia to hydrogen cyanide ranged from 45% to 58%.

*Example VI*

Beryl was coated with a platinum-iridium alloy (approximately 80% platinum and 20% iridium). The reactant gases were prepared by mixing 1 volume of ammonia with 1.90 volumes of methane and 9.0 volumes of air. The gaseous mixture was passed over the catalyst, which was maintained at a temperature of 1000° C. to 1200° C., giving a conversion of 67% of the ammonia to hydrogen cyanide.

*Example VII*

A catalyst was prepared of platinum and iridium (approximately 80% platinum and 20% iridium) which was applied as a coating on porcelain granules of the following composition: 97% $Al_2O_3$, 2.0% $ZrO_2$, 0.5% CaO, and 0.5% MgO. The catalyst was prepared substantially as disclosed above, including crushing, screening, etching, washing, and coating until five layers of metal were placed on the granular porcelain. A gas mixture of 1 volume of ammonia, 1.90 volumes of methane, and 9.0 volumes of air was passed over the catalyst which has maintained at a temperature of 1000° C. to 1200° C., effecting a conversion of 67% of the ammonia to hydrogen cyanide.

*Example VIII*

The reaction of Example VII was carried out using a platinum alloy of the following composition: 90% platinum, 5% rhodium, and 5% palladium, coated on porcelain granules of the composition shown in Example VII. The conversion of ammonia to hydrogen cyanide was 66%.

*Example IX*

The reaction of Example VII was carried out using a catalyst formed by first coating the porcelain particles with one layer of substantially pure palladium, and then superimposing four layers of platinum-rhodium alloy (approximately 80% platinum and 20% rhodium) on the palladium layer. Conversion of ammonia to hydrogen cyanide was 67%. The purpose of the inner layer of palladium was to improve the bond between the porcelain and the platinum alloy.

Alumina, calcia, and magnesia porcelains do not give a desirable conversion of ammonia to hydrogen cyanide, while the addition of 1% to 5%, by weight, of zirconia to these porcelains has been found to increase the conversion from 9% to 22% as shown by comparing Example V with the other examples. The beryl support gives good conversion percentages, but such a support has the inherent disadvantage that it is extremely difficult to secure different lots of the mineral with the same chemical composition. It has heretofore been necessary to carefully sort and select shipments of beryl, and then experiment with the sorted lots in a cut-and-try manner until one was found which would cause the desired conversion of ammonia to hydrogen cyanide. The reaction of converting ammonia to hydrogen cyanide is sensitive to impurities, producing undesirable by-products and causing a lower conversion where such impurities are in contact with the reacting gases. For these reasons, it is considerably less expensive and it is a great advantage to use a synthetic, chemically-reproducible catalyst support such as hereinbefore described.

I claim:

1. The process which comprises passing a gaseous mixture of ammonia, natural gas, and air over a platinum alloy catalyst coated on alumina-zirconia porcelain particles containing 90%–98% $Al_2O_3$ and 1%–5% $ZrO_2$.

2. The process which comprises passing a gaseous mixture of ammonia, methane, and air over porcelain granules containing about 97.0% $Al_2O_3$, and 2.0% $ZrO_2$, said granules being coated with a platinum-rhodium alloy.

3. The process which comprises passing a gaseous mixture of ammonia, natural gas, and air over porcelain granules, containing about 97.0% $Al_2O_3$ and 2.0% $ZrO_2$, said granules being coated with an alloy containing about 80% platinum and 20% rhodium.

4. The process which comprises passing a gaseous mixture of ammonia, natural gas, and air over porcelain granules containing about 97.0% $Al_2O_3$ and 2.0% $ZrO_2$, said granules being coated with a platinum-iridium alloy.

5. The process which comprises passing a gaseous mixture of ammonia, natural gas, and air over porcelain granules containing about 97.0% $Al_2O_3$ and 2.0% $ZrO_2$, said granules being coated with a platinum-palladium alloy.

6. The process which comprises passing a gaseous mixture of ammonia, natural gas, and air over porcelain granules containing about 97.0% $Al_2O_3$ and 2.0% $ZrO_2$, said granules being coated with a platinum-rhodium-palladium alloy.

7. The process which comprises passing a gaseous mixture of ammonia, natural gas, and air over porcelain granules containing about 97.0% $Al_2O_3$ and 2.0% $ZrO_2$, said granules being coated with a single inner layer of palladium and at least four outer layers of a platinum alloy.

8. The process which comprises passing a gaseous mixture of ammonia, natural gas, and air, at a temperature of about 1000° C. to about 1200° C., over porcelain particles containing about 97.0% $Al_2O_3$ and 2.0% $ZrO_2$, said granules being coated with a metallic alloy of about 80% platinum and 20% rhodium.

References Cited in the file of this patent

UNITED STATES PATENTS

| | | |
|---|---|---|
| 2,076,953 | Lacy | Apr. 13, 1937 |
| 2,079,404 | Harris | May 4, 1937 |
| 2,444,913 | Bond | July 13, 1948 |
| 2,500,146 | Fleck | Mar. 14, 1950 |
| 2,580,806 | Malina | Jan. 1, 1952 |